Patented June 15, 1948

2,443,482

UNITED STATES PATENT OFFICE 2,443,482

CONTINUOUS GLYCOLIC ACID PROCESS

Morris T. Shattuck, Charleston, W. Va., assignor to E. I. du Pont de Nemours & Company, Wilmington, Del., a corporation of Delaware No Drawing. Application August 6, 1946, Serial No. 688,705

6 Claims. (Cl. 260—535)

This invention relates to an improved process for the preparation of glycolic acid and more particularly to its preparation by means of a continuous process from formaldehyde and carbon monoxide.

The preparation of glycolic acid from formaldehyde and carbon monoxide is fully set forth in U. S. 2,152,852 of D. J. Loder, patented April 4, 1939. The process involves bringing the reactants, including water or its equivalent together in the presence of an acid catalyst under temperatures ranging between 140 and 250° C. and pressures preferably above atmospheric ranging from, for example, 5 atmospheres to 1500 atmospheres or higher. The ratio of reactants is not particularly critical although the quantity of water present should equal at least 0.5 mole per mole of formaldehyde while an excess of carbon monoxide is employed with respect to the formaldehyde. The water, if desired, may be replaced in whole or in part by alcohols or organic acids such, for example, as are described in U. S. 2,153,064, patented April 4, 1939, of A. T. Larson.

An object of the present invention is to provide an improved continuous process for the preparation of glycolic acid. Another object is to provide a process for the preparation of glycolic acid from formaldehyde and carbon monoxide in which, throughout a continuous reaction, the average concentration of formaldehyde present in the reaction mixture is maintained at an optimum value. Yet another object is to provide a continuous process as characterized above wherein the formaldehyde is introduced prior to and during the reaction with a prescribed periodicity which will result in optimum yields of glycolic acid. Other objects and advantages will hereinafter appear.

It has been found in the preparation of glycolic acid from formaldehyde and carbon monoxide that many side reactions occur, the principal reaction of this type being the conversion of the formaldehyde to methyl formate. Moreover, careful analysis has shown that the rate of formation of this ester increases, all other conditions remaining constant, in direct proportion to the formaldehyde concentration. While in a discontinuous process, proportions of reactants can be adjusted to those concentrations of formaldehyde such that the formation of methyl formate is inhibited; in a continuous process, on the other hand, low concentrations of formaldehyde in the feed result in poor utilization of equipment due to lowered capacity, thereby naturally defeating the purpose of a continuous process which is to provide a low cost, high capacity, process and the advantage in throughput derived from high formaldehyde is negatived by high methyl formate and other by-product formation.

In accord with this invention, it has been found that excellent yields can be obtained when conducting the reaction continuously if the formaldehyde concentration is maintained at approximately the optimum value for highest yields of glycolic acid. This is accomplished by periodically introducing the formaldehyde into the reacting mixture whereby the average concentration of formaldehyde in the mixture is maintained below that value which produces undesirable amounts of methyl formate or other by-products. The invention, accordingly, is predicated on the introduction of formaldehyde at the beginning and during the reaction as the reactants proceed through the reaction zone.

The process may be illustrated as being conducted in a plurality of converters through which the reacting gases and products pass successively. A reaction mixture having a comparatively low formaldehyde concentration is passed into the first converter of the series and when the formaldehyde has been consumed in its reaction with carbon monoxide and water or the equivalent of water, more formaldehyde is introduced. This may be repeated several times and it will be found that the greater the number of injections of formaldehyde giving low concentrations thereof, the higher will be the yield of glycolic acid and the lower the production of undesirable by-products. The advantages of decreased concentration appear to continue down to total disappearance of formaldehyde and the theoretical ideal unit would operate at a concentration of less than 1% by weight of formaldehyde which, of course, is impractical. As a consequence for commercial operation, units operate with formaldehyde concentrations considerably above this level and it is desirable in such units to react essentially all the formaldehyde present prior to the introduction of more formaldehyde. In accord with this invention, the maximum formaldehyde introduced may range between 2 to 12% by weight of the reactants and preferably between 6 and 10% while the minimum concentration of formaldehyde, that is, the concentration at which more formaldehyde is introduced into the reaction, may range between 0.02 and 3% and preferably between 0.05 and 1.5%.

The examples describe preferred embodiments of the invention in which parts are by weight unless otherwise indicated.

*Example 1.*—A mixture containing 86.2 lbs. of recycled product together with a formaldehyde solution containing 7.4 lbs. of formaldehyde and 5.0 lbs. of water and 1.4 lbs. of concentrated sulfuric acid as the catalyst, which mixture has a formaldehyde concentration of about 7.6% including the formaldehyde in the recycled product, was preheated to a temperature of 205° C. 26.0 lbs. of carbon monoxide added and the resulting mixture injected at 9300 lbs. per square inch into a pressure-resisting converter. The resulting mixture was then passed successively through two other converters, all of which were maintained at a temperature between 204 and 220° C. At the exit of the third converter, the formaldehyde concentration was about 0.9%. At this point a solution of 8.4 lbs. of formaldehyde and 5.6 lbs. of water was injected giving a formaldehyde concentration of about 7.6%. The mixture was then passed through three more converters held at a temperature between 204 and 220° C. At the exit of the sixth converter formaldehyde concentration was again at about 0.9%. At this point a solution of 9.9 lbs. of formaldehyde and 6.6 lbs. of water was injected and the resulting mixture passed through four more converters held at a temperature between 204 and 220° C. The total formaldehyde fed to the unit was 25.7 lbs. (0.857 mole). After the last converter, the reaction mixture was passed through coolers and the pressure let down to a low pressure separator, where 3.7 lbs. of carbon monoxide off-gas and 152.8 lbs. of product were obtained. Formaldehyde concentration of the product was 0.25%. 86.2 lbs of the product were recycled and 66.6 lbs. were sent to product storage. That product to storage contained 58.1 lbs. (0.765 mole) of glycolic acid, 0.17 lb. (0.006 mole) formaldehyde, 4.3 lbs. (0.086 mole) methyl formate and other by-products, 2.6 lbs. of water and 1.4 lbs. of sulfuric acid. The yield of formaldehyde to glycolic acid was 89.3% to by-products 10.0% to unconverted formaldehyde 0.7%. Efficiency of equipment utilization, or lbs. of glycolic acid produced per 100 lbs. of throughput recycled acid plus formaldehyde solution = 58.1/(100 + 30.5) =44.5.

*Example 2.*—A mixture containing 67.5 lbs. of recycled product, and a formaldehyde solution containing 19.0 lbs. (0.633 mole) formaldehyde and 12.7 lbs. of water and 0.8 lb. of sulfuric acid, which gave a formaldehyde concentration of 19.1% including formaldehyde present in the recycled product, was preheated to 205° C. an injected after the addition of 20.4 lbs. of carbon monoxide into a series of converters under a pressure of 9,200 p. s. i. pressure. The temperature of the converters ranged between 205 and 223° C. After passing the last converter the mixture was passed through coolers and was let down to a low pressure separator where 5.3 lbs. of carbon monoxide off-gas and 115.1 lbs. of product were obtained. Formaldehyde concentration of the product equalled 0.15%. 67.5 lbs. of the product were recycled and 47.6 lbs. sent to storage. The net product of storage contained 38.4 lbs. (0.505 mole) glycolic acid, 0.08 lb. (0.003 mole) formaldehyde, 4.2 lbs. (0.125 mole) by-products, 4.1 lbs. of water and 0.8 lb. of sulfuric acid. The yield of formaldehyde to glycolic acid was 79.7%, to by-products 19.8%, to formaldehyde unconverted 0.5%. Efficiency of equipment utilization or lbs. of glycolic acid produced per 100 lbs. injected equalled 38.4 compared with the multipoint injection process of Example 1, which employed the same rate of injection, a 10% increase in yield of glycolic acid was obtained in that process and a decrease of 9.8% in by-product formation.

While theoretically maximum production would be obtained in a continuous process by the introduction of formaldehyde in an infinite number of points along the reaction zone at substantially the rate at which it is consumed, thereby maintaining the composition of formaldehyde at the critical percentage for optimum conversion, it is not practical to operate in this manner. Excellent yields, however, can be closely approached by introducing the formaldehyde into the converter in a plurality of stages, the yield increasing with the increase in the number of stages and approaching the yield of a batchwise process as the apparent limit.

Other advantages are derived from operating in accord with this process. The maintenance of a low average concentration within the converter permits the processing of practically the same amount of formaldehyde at a much lower over-all formaldehyde concentration in the synthesis stream or, put another way, it permits the processing of more formaldehyde at the same concentration. It has been found that the performance of the glycolic acid synthesis from formaldehyde and carbon monoxide is inversely related to the formaldehyde concentration in the synthesis stream and consequently by lowering the concentration as provided by the process of this case more optimum results are obtained. Furthermore, operating and capital savings in the quantity of recycled acid which has to be rehandled is materially reduced with the attendant requirements of larger preheaters, coolers, separators, pumps, and the like.

I claim:

1. In a process for the preparation of glycolic acid from a reaction mixture of formaldehyde, carbon monoxide and a compound supplying water for the reaction, wherein the reaction mixture flows continuously into and the glycolic acid produced flows continuously out of a reaction zone, the step which comprises introducing the formaldehyde as the reactants proceed into and through the reaction zone with a periodicity such that the formaldehyde concentration is maintained throughout the reaction zone at a maximum concentration between 4 and 12% based on the total weight of the reacting mixture.

2. In a process for the preparation of glycolic acid from a reaction mixture of formaldehyde, carbon monoxide and a compound supplying water for the reaction, wherein the reaction mixture flows continuously into and the glycolic acid produced flows continuously out of a reaction zone, the step which comprises introducing the formaldehyde as the reactants proceed into and through the reaction zone with a periodicity such that the formaldehyde concentration is maintained throughout the reaction zone at a maximum concentration between 6 and 10% based on the total weight of the reacting mixture.

3. In a process for the preparation of glycolic acid from a reaction mixture of formaldehyde, carbon monoxide and a compound supplying water for the reaction, wherein the reaction mixture flows continuously into and the glycolic acid produced flows continuously out of a reaction zone, the step which comprises introducing the formaldehyde as the reactants proceed into and through the reaction zone with a periodicity such that the formaldehyde concentration is maintained throughout the reaction zone at a maximum concentration between 4 and 12% and a minimum between 0.02 and 3% based on the total weight of the reacting mixture.

4. In a process for the preparation of glycolic acid from a reaction mixture of formaldehyde, carbon monoxide and a compound supplying water for the reaction, wherein the reaction mixture flows continuously into and the glycolic acid produced flows continuously out of a reaction zone, the step which comprises introducing the formaldehyde as the reactants proceed into and through the reaction zone with a periodicity such that the formaldehyde concentration is maintained throughout the reaction zone at a maximum concentration between 6 and 10% and a minimum between 0.05 and 1.5% based on the total weight of the reacting mixture.

5. In a process for the preparation of glycolic acid from a reaction mixture of formaldehyde, carbon monoxide and water, wherein the reaction mixture flows continuously into and the glycolic acid produced flows continuously out of a reaction zone, the step which comprises conducting the reaction in a plurality of reaction zones through which the reactants pass successively, introducing a portion of the total formaldehyde into the inlet of the first zone and the remainder of the formaldehyde in a plurality of positions between subsequent reaction zones, the formaldehyde being introduced to give a maximum concentration throughout the reaction of between 6 and 11% and a minimum concentration between 0.05 and 1.5% based on the total weight of the reacting mixture.

6. In a continuous process for the preparation of glycolic acid from a reaction mixture of formaldehyde, carbon monoxide, and a compound supplying water for the reaction, wherein the reaction mixture flows continuously into, and the glycolic acid produced flows continuously out of a reaction zone, the reaction taking place during the flow of the reactants through the zone, the steps which comprise initiating the reaction with a formaldehyde concentration between 4 and 12% by weight of the reactants and replenishing the supply of formaldehyde to give a formaldehyde concentration between 4 and 12% by weight of the reactants, in the portion of the zone where the formaldehyde concentration drops to between 0.05 and 1.5%.

MORRIS T. SHATTUCK.

REFERENCES CITED

The following references are of record in the file of this patent:

UNITED STATES PATENTS

| Number | Name | Date |
| --- | --- | --- |
| 2,015,347 | Luther et al. | Sept. 24, 1935 |
| 2,152,852 | Loder | Apr. 4, 1939 |
| 2,153,064 | Larson | Apr. 4, 1939 |